United States Patent [19]
Ko et al.

[11] Patent Number: 5,083,203
[45] Date of Patent: Jan. 21, 1992

[54] CONTROL SIGNAL SPREADER

[75] Inventors: Jung-Wan Ko, Suwon, Rep. of Korea; Hermann J. Weckenbrock, Bordentown, N.J.

[73] Assignee: SamSung Electronics Co., Ltd., Suwon, Rep. of Korea

[21] Appl. No.: 531,057

[22] Filed: May 31, 1990

[51] Int. Cl.$^5$ ............................................... H04N 7/12
[52] U.S. Cl. ..................................... 358/105; 358/167
[58] Field of Search .................. 358/105, 31, 167, 166

[56] References Cited
U.S. PATENT DOCUMENTS

4,539,594  9/1985  Illetschko ............................ 358/167
4,733,297  3/1988  Katsumata et al. ................. 358/105
4,868,650  9/1989  Weckenbrock ................... 358/31 X Primary Examiner—Victor R. Kostak
Attorney, Agent, or Firm—Robert E. Bushnell

[57] ABSTRACT

Apparatus for spreading a control signal comprised of widening circuits for extending the control signal horizontally and vertically, a line signal spreading circuit for generating a ramp of increasing values during a given interval at the beginning of each extended control signal, maintaining the maximum value of the ramp for the remainder of the extended control signals and generating a ramp of decreasing values at the end of each extended control signal and also including a circuit for combining the signal values at corresponding points along a plurality of lines as the lines are scanned.

6 Claims, 10 Drawing Sheets

TIME

| W1 | 1 | 2 | 3 | 4 | 5 | 6 | 7 | 7 | 6 | 5 | 4 | 3 | 2 | 1 | L1 |
| W2 | 2 | 4 | 6 | 8 | 10 | 12 | 14 | 14 | 12 | 10 | 8 | 6 | 4 | 2 | L2 |
| W3 | 3 | 6 | 9 | 12 | 15 | 18 | 21 | 21 | 18 | 15 | 12 | 9 | 6 | 3 | L3 |
| W4 | 4 | 8 | 12 | 16 | 20 | 24 | 28 | 28 | 24 | 20 | 16 | 12 | 8 | 4 | L4 |
| W5 | 5 | 10 | 15 | 20 | 25 | 30 | 35 | 35 | 30 | 25 | 20 | 15 | 10 | 5 | L5 |
| W6 | 4 | 8 | 12 | 16 | 20 | 24 | 28 | 28 | 24 | 20 | 16 | 12 | 8 | 4 | L6 |
| W7 | 3 | 6 | 9 | 12 | 15 | 18 | 21 | 21 | 18 | 15 | 12 | 9 | 6 | 3 | L7 |
| W8 | 2 | 4 | 6 | 8 | 10 | 12 | 14 | 14 | 12 | 10 | 8 | 6 | 4 | 2 | L8 |
| W9 | 1 | 2 | 3 | 4 | 5 | 6 | 7 | 7 | 6 | 5 | 4 | 3 | 2 | 1 | L9 |

|  | L1 | L2 | L3 | L4 | L5 | L6 | L7 | L8 | L9 | L10 | L11 | L12 | L13 | L14 | L15 | L16 | L17 | L18 | L19 |
|---|---|---|---|---|---|---|---|---|---|---|---|---|---|---|---|---|---|---|---|
|  | 0 | 0 | 0 | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 1 | 1 | 1 | 1 | 1 | 1 | 0 | 0 | 0 | 0 | 0 | 0 | 0 | 0 |
|  | 0 | 0 | 0 | 0 | 0 | 2 | 2 | 2 | 2 | 2 | 2 | 0 | 0 | 0 | 0 | 0 | 0 | 0 | 0 |
|  | 0 | 0 | 0 | 0 | 0 | 3 | 3 | 3 | 3 | 3 | 3 | 0 | 0 | 0 | 0 | 0 | 0 | 0 | 0 |
|  | 0 | 0 | 0 | 0 | 0 | 4 | 4 | 4 | 4 | 4 | 4 | 0 | 0 | 0 | 0 | 0 | 0 | 0 | 0 |
|  | 0 | 0 | 0 | 0 | 0 | 5 | 5 | 5 | 5 | 5 | 5 | 0 | 0 | 0 | 0 | 0 | 0 | 0 | 0 |
|  | 0 | 0 | 0 | 0 | 0 | 6 | 6 | 6 | 6 | 6 | 6 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 7 | 7 | 7 | 7 | 7 | 7 | 0 | 0 | 0 | 0 | 0 | 0 | 0 | 0 |
|  | 0 | 0 | 0 | 0 | 0 | 6 | 6 | 6 | 6 | 6 | 6 | 0 | 0 | 0 | 0 | 0 | 0 | 0 | 0 |
|  | 0 | 0 | 0 | 0 | 0 | 5 | 5 | 5 | 5 | 5 | 5 | 0 | 0 | 0 | 0 | 0 | 0 | 0 | 0 |
|  | 0 | 0 | 0 | 0 | 0 | 4 | 4 | 4 | 4 | 4 | 4 | 0 | 0 | 0 | 0 | 0 | 0 | 0 | 0 |
|  | 0 | 0 | 0 | 0 | 0 | 3 | 3 | 3 | 3 | 3 | 3 | 0 | 0 | 0 | 0 | 0 | 0 | 0 | 0 |
|  | 0 | 0 | 0 | 0 | 0 | 2 | 2 | 2 | 2 | 2 | 2 | 0 | 0 | 0 | 0 | 0 | 0 | 0 | 0 |
|  | 0 | 0 | 0 | 0 | 0 | 1 | 1 | 1 | 1 | 1 | 1 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 0 | 0 | 0 | 0 |

FIG. 4E

| | LINE 1 | LINE 2 | LINE 3 | LINE 4 | LINE 5 | LINE 6 | LINE 7 | LINE 8 | LINE 9 | LINE 10 | LINE 11 | LINE 12 | LINE 13 | LINE 14 | LINE 15 | LINE 16 | LINE 17 | LINE 18 | LINE 19 | LINE 20 | LINE 21 |
|---|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 1 | 2 | 3 | 4 | 5 | 5 | 4 | 3 | 2 | 1 | 0 | 0 | 0 | 0 | 0 | 0 |
| | 0 | 0 | 0 | 0 | 0 | 2 | 4 | 6 | 8 | 10 | 10 | 8 | 6 | 4 | 2 | 0 | 0 | 0 | 0 | 0 | 0 |
| | 0 | 0 | 0 | 0 | 0 | 3 | 6 | 9 | 12 | 15 | 15 | 12 | 9 | 6 | 3 | 0 | 0 | 0 | 0 | 0 | 0 |
| | 0 | 0 | 0 | 0 | 0 | 4 | 8 | 12 | 16 | 20 | 20 | 16 | 12 | 8 | 4 | 0 | 0 | 0 | 0 | 0 | 0 |
| | 0 | 0 | 0 | 0 | 0 | 5 | 10 | 15 | 20 | 25 | 25 | 20 | 15 | 10 | 5 | 0 | 0 | 0 | 0 | 0 | 0 |
| | 0 | 0 | 0 | 0 | 0 | 6 | 12 | 18 | 24 | 30 | 30 | 24 | 18 | 12 | 6 | 0 | 0 | 0 | 0 | 0 | 0 |
| | 0 | 0 | 0 | 0 | 0 | 7 | 14 | 21 | 28 | 35 | 35 | 28 | 21 | 14 | 7 | 0 | 0 | 0 | 0 | 0 | 0 |
| | 0 | 0 | 0 | 0 | 0 | 7 | 14 | 21 | 28 | 35 | 35 | 28 | 21 | 14 | 7 | 0 | 0 | 0 | 0 | 0 | 0 |
| | 0 | 0 | 0 | 0 | 0 | 7 | 14 | 21 | 28 | 35 | 35 | 28 | 21 | 14 | 7 | 0 | 0 | 0 | 0 | 0 | 0 |
| | 0 | 0 | 0 | 0 | 0 | 7 | 14 | 21 | 28 | 35 | 35 | 28 | 21 | 14 | 7 | 0 | 0 | 0 | 0 | 0 | 0 |
| | 0 | 0 | 0 | 0 | 0 | 7 | 14 | 21 | 28 | 35 | 35 | 28 | 21 | 14 | 7 | 0 | 0 | 0 | 0 | 0 | 0 |
| | 0 | 0 | 0 | 0 | 0 | 6 | 12 | 18 | 24 | 30 | 30 | 24 | 18 | 12 | 6 | 0 | 0 | 0 | 0 | 0 | 0 |
| | 0 | 0 | 0 | 0 | 0 | 5 | 10 | 15 | 20 | 25 | 25 | 20 | 15 | 10 | 5 | 0 | 0 | 0 | 0 | 0 | 0 |
| | 0 | 0 | 0 | 0 | 0 | 4 | 8 | 12 | 16 | 20 | 20 | 16 | 12 | 8 | 4 | 0 | 0 | 0 | 0 | 0 | 0 |
| | 0 | 0 | 0 | 0 | 0 | 3 | 6 | 9 | 12 | 15 | 15 | 12 | 9 | 6 | 3 | 0 | 0 | 0 | 0 | 0 | 0 |
| | 0 | 0 | 0 | 0 | 0 | 2 | 4 | 6 | 8 | 10 | 10 | 8 | 6 | 4 | 2 | 0 | 0 | 0 | 0 | 0 | 0 |
| | 0 | 0 | 0 | 0 | 0 | 1 | 2 | 3 | 4 | 5 | 5 | 4 | 3 | 2 | 1 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 | 0 | 0 | 0 | 0 |

| MS | PROM #1 | | PROM #2 | |
| --- | --- | --- | --- | --- |
| | INPUT | FUNCTION | INPUT | FUNCTION |
| 0 | B1 | PASS B1 | A2 | $f(x) = x-1$ |
| 1 | A1 | $f(x) = x+1$ | B2 | PASS B2 |

CONTROL SIGNAL SPREADER

BACKGROUND OF THE INVENTION

The present invention relates to a system for smoothing or spreading transitions between regions of an image transmitted by a television signal which are processed in a first way and those which are processed in a second different way.

Processing of standard television signals, (such as NTSC or PAL), which represent images, is often changed to adapt to the environment of the signal. This adaptive processing can result in some regions of an image being processed in one way and other adjoining regions being processed in a different way. If the processing differences can be perceived by a viewer, the different regions, and the transition between them, can be discerned, and image quality is degraded.

For example, when separating chrominance and luminance components from the composite video signal, a frame comb filter may be used. As long as there is not change in the image over a frame time interval, the luminance and chrominance components can be completely separated. If the scene changes over the frame time interval, then some color information will be present in the separated luminance component and some brightness information will be present in the chrominance component.

A line comb filter will also separate the luminance and chrominance components from the composite video signal and does not produce significantly degraded component signals in the presence of image motion. However, a line comb filter reduces the vertical resolution of the reproduced image relative to a frame comb filter. In addition, in locations where a vertical transition occurs, an image processed by a line comb filter may be degraded due to color information being introduced into the luminance component, producing an image artifact known as hanging dots; and brightness information being introduced into the chrominance, producing incorrect colors in the neighborhood of the transition.

The television signal may be adaptively processed by detecting the presence or absence of image motion. In regions in which the image is stationay, the frame comb filter is used, and in regions in which the image is changing, the line comb filter is used.

Another example of such adaptive processing is an adaptive double-scanned non-interlaced scan converter. In such a converter, interstitial lines are displayed between lines of the current field. The interstitial lines may be those from the preceding field, however, in such presence of image changes, visible artifacts, such as serrated edges, occur. The interstitial lines may also be interpolated from lines within the current field, but the vertical resolution is reduced and line flicker may occur. In regions in which image changes are detected, intrafield interpolated interstitial lines are displayed and field-delayed interstitial lines are displayed otherwise.

Yet another example is an adaptive peaking circuitry in which regions having relatively high noise are processed with a relatively low peaking factor and regions having relatively low noise are processed with a relatively high peaking factor.

In all of the above examples, the processing of the television signals is changed in response to the value of an estimated parameter of the image. The parameter is motion in the case of luminance/chrominance separation and double scanning non-interlaced conversion, and it is the relative level of noise in the case of the peaking. Differently processed regions, and noticeable boundaries between those regions where the parameter is present and where it is absent is an undesirable artifact introduced by the above types of adaptive processing. It is desirable to reduce the visibility of this artifact in such systems and thereby improve the perceived quality of the image.

In accordance with the invention described in U.S. Pat. No. 4,868,650, issued on Sept. 19, 1989, to H. J. Weckenbrock, a parameter of the composite video signal is estimated for points in the image. A control signal is then generated based on the parameter. This control signal may be used to control the selection of processing modes. The value of the control signal is then spread symmetrically in a gradually decreasing manner around the region in which the control signal is generated in at least one direction. This generates a region in which the processing gradually changes from a region in which one type of processing is performed to that in which the other type of processing is performed.

BRIEF SUMMARY OF THE INVENTION

In the following description of apparatus for spreading a control signal, the word "horizontal" will refer to a direction along the scan lines and the word "vertical" will refer to a direction perpendicular to the scan lines. Although the invention can be carried out by analog circuits, it will be described in digital form.

As the control signals are derived for pixels along the scan lines, they have a fixed control signal amplitude such as one, and the rest of the signals have reference values such as zero. As is well understood by those skilled in the art, each scan line has a fixed number of pixels, and when this number of pixels is received, image forming apparatus places the next pixel at the beginning of the next line.

In accordance with this invention, the control signal is applied to a horizontal widener and a vertical widener that are connected in series in either order. The horizontal widener repeats each logic 1 of a control signal n times, where n is equal to the number of clock delay elements in the horizontal widener 32, and the vertical widener repeats each scan line m times where m is equal to the number of line delays, denoted by "1—H" delays, in the vertical widener 34. Thus m+1 identical scan lines are produced, each having 1's at the locations along the lines where the original control signals occurred and n more 1's occurring immediately thereafter.

As the extended set of control signal values, including the repeated scan lines, emerges from the horizontal and vertical wideners, it is applied to a line signal spreader that creates a ramp of increasing values starting at the first original control signal pixel and extending through the l pixels following it. The line signal spreader retains the maximum value it created at the end of the ramp of n pixels until the last 1 has been received. At this point, the line signal spreader creates a ramp of decreasing values during the following r pixels, it being understood that r may be equal to n to achieve symmetry between the ramp of increasing values and the ramp of decreasing values.

Thus instead of having a control signal that abruptly changes from a 0 to a 1 and back to a 0, the line signal spreader generates a signal that gradually changes from a 0 to a maximum value, such as 7, at the point where the original control signal just appeared, retains this value during a number of clock cycles equal to the number of contiguous control signals and then gradually decreases that signal back to a value of 0. At this point there are m+1 identical lines.

Whereas this spreads the control signal horizontally along each of m+1 lines, there is no vertical spreading because all the lines have the same values. Vertical spreading is achieved in accordance with the preferred form of this invention by effectively forming a window that is one clock cycle wide and m+1 lines high. This window is scanned horizontally until the end of the lines are reached and then dropped by one line before again scanning across the lines. The control signal value for the point corresponding to the bottom of the window is a function of all the values within the window. Simple addition of the values within this window has been found to work well.

As is well understood by those skilled in the art, the necessary delays required to obtain the spread control signals in this manner will cause the spread control values for the original control signals to be delayed by n pixel intervals plus m scan line intervals with respect to the corresponding video signal. This can be corrected by delaying the video signals by n pixels and m line scanning intervals.

A distinct advantage of this method for spreading control signals is that the maximum value of the rising ramp occurs at the first original control signal pixel and not at some later pixel as in other methods.

BRIEF DESCRIPTION OF THE DRAWING

FIG. 3B' illustrates operation when the position of the horizontal and vertical wideners are reversed.

DETAILED DESCRIPTION

The illustrated embodiment described below will be discussed in terms of a motion adaptive luminance/chrominance separator. A similar arrangement could be used for other adaptive processing circuits such as double scanned noninterlaced adaptive scan conversion, or adaptive peaking.

Figure 1:
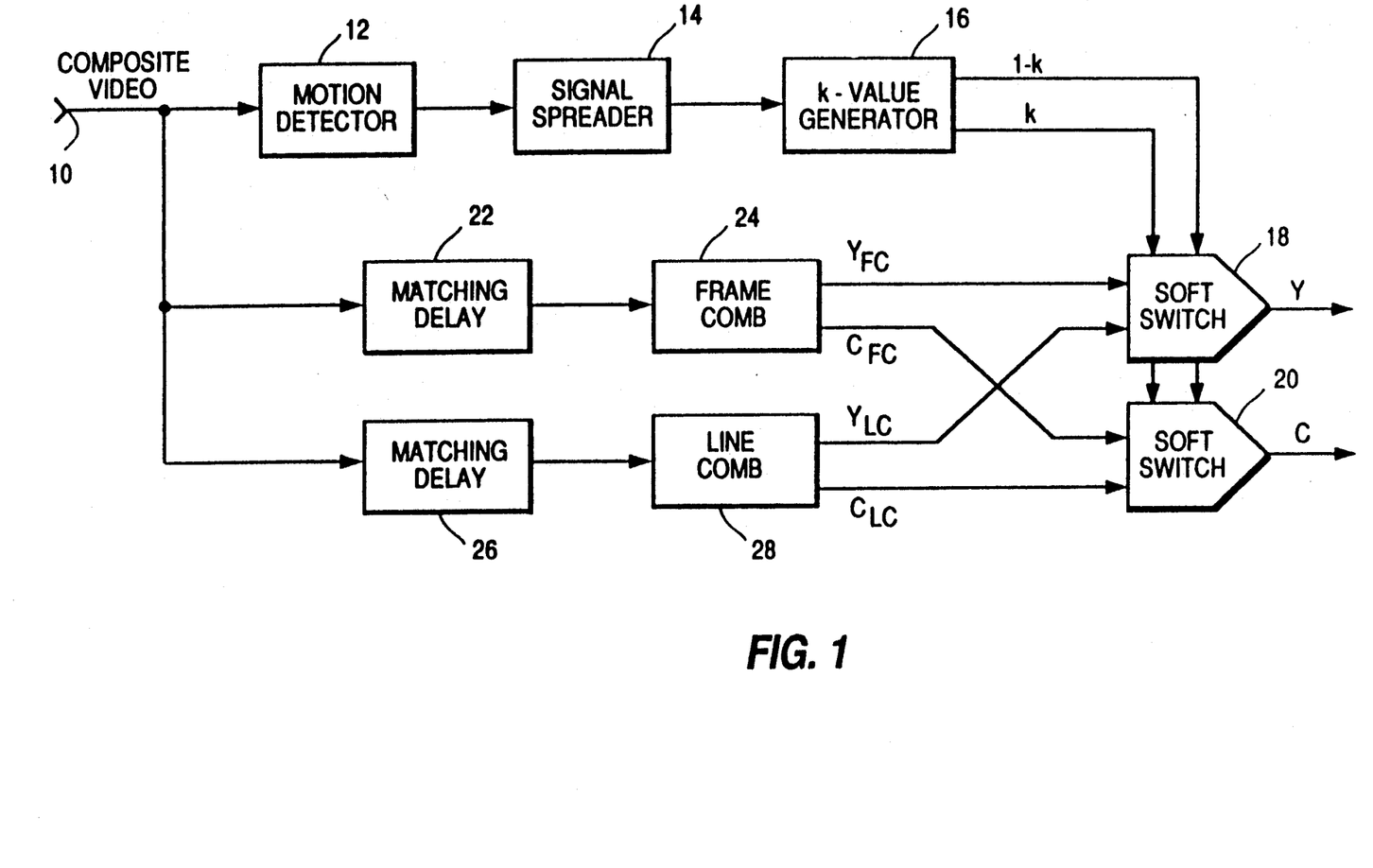
FIG. 1 is a block diagram of television equipment in which a control signal representing motion is spread so as to create a better color image from signals transmitted in accordance with the NTSC standard.

In FIG. 1 a composite video signal such as that derived from an NTSC telecast by a television receiver is applied at terminal 10. A motion detector 12 provides a signal having a value such as 1 when motion is considered to exist and a reference signal 0 when motion is not considered to exist to a signal spreader 14 such as described herein. A 'k' value generator 16 responds to the signal at the output of the signal spreader 14 to produce values of k and 1−k for the control of soft switches 18 and 20. The composite video signal at terminal 10 is applied via a matching delay 22 to a frame comb 24 and via a matching delay 26 to a line comb 28.

When there is no motion in the image, the output of the frame comb 24 is used to provide the luminance signal $Y_{FC}$ and the chrominance signal $C_{FC}$. Frame comb filters take advantage of the fact that in the absence of motion two composite video images separated by a frame time interval differ only in the phase of the chrominance signal. Therefore, when two composite video signals one frame apart are added, the chrominace is cancelled whereas the luminance is reinforced, so as to provide a luminance signal free from color contamination. Similarly the subtraction of those two signals cancels the luminance and provides a chrominance signal free of luminance contamination. However, when there is motion, the output of the line comb 28 is used. Since there is normally only little change from one line to the next and since the chrominance signal is 180 degrees out of phase on adjacent lines, addition of the signals from like points on adjacent lines cancels the chrominance components and reinforces the luminance components, and subtraction cancels the luminance and reinforces the chrominance so as to provide uncontaminated luminance and chrominance signals. However, the line comb filter reduces the vertical resolution by half.

If the frame comb signals from the comb 24 were used only when there is no motion and the line comb signals from the comb 28 were used only when there is motion, the difference between areas of the picture where there is no motion and areas where there is motion would be very noticable in most cases. Therefore, it is better to gradually use less of the signals from the frame comb 24 and more of the signals from the line comb 28 as the scanning of the image gets closer to that region where there is motion. Where there is motion, k=1, and where there is not motion, k=0. In the region surrounding areas of motion, k takes on intermediate values. The value of k thus determines the relative amounts of the outputs of the combs 24 and 28 that are blended together in the soft switches 18 and 20.

The signal spreader 14 outputs a maximum value at points where there is motion and values that gradually become smaller as the distance from the area where there is motion increases.

Figure 2:
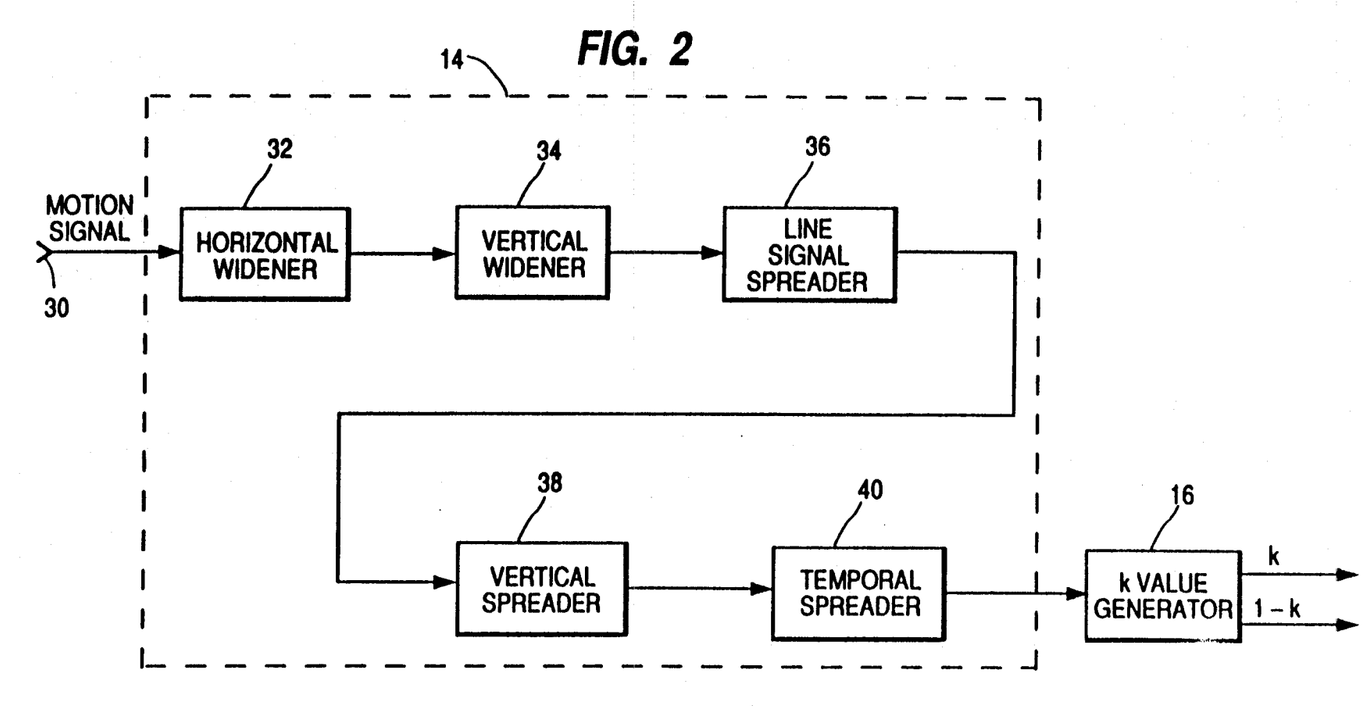
FIG. 2 is a block diagram of a control signal spreader constructed in accordance with this invention.

Reference is now made to the block diagram of FIG. 2 illustrating the main components of a control signal spreader constructed in accordance with the invention.

Control signals, having values of 1 when a phenomenon such as motion is present and a value of 0 when it is not present, are supplied to terminal 30. A suitable means for providing such control signals is the motion detector 12 of FIG. 1.

A horizontal widener 32 is coupled to the input terminal 30 and passes all 1's applied to terminal 30 and produces additional n 1's after the last 1 is applied to the terminal 30. A vertical widener 34 coupled to the output of the horizontal widener 32 repeats each line emerging from the horizontal widener m times.

A line signal spreader 36 coupled from widener 34 provides a ramp of increasing values during the first n+1 1's of each line emerging from the vertical widener 34, maintains the maximum value of the ramp as long as 1's are present, and provides a ramp of decreasing values during the next r pixels. In the usual case n=r to achieve symmetry between the two ramps. Thus, there are m=1 lines having an increasing ramp of values, a series of maximum values and a decreasing range of values.

A vertical signal spreader 38 and temporal spreader 40 respectively coupled from line signal spreader 36 derive the control signal values to be used by the k-value generator 16 to generate k and 1−k which in turn are used to control the soft switches 18 and 20. Temporal spreader 40, if desired, is suitably a lowpass filter. It provides gradual transitions between still and motion portions of a scene in the temporal domain.

These control signal values are formed by sliding a window that is one clock cycle wide and m+1 lines high across the raster and combining the values within this window in a certain way. Although different functions for combining these values are possible, it has been found that simple addition works well.

Figure 3:
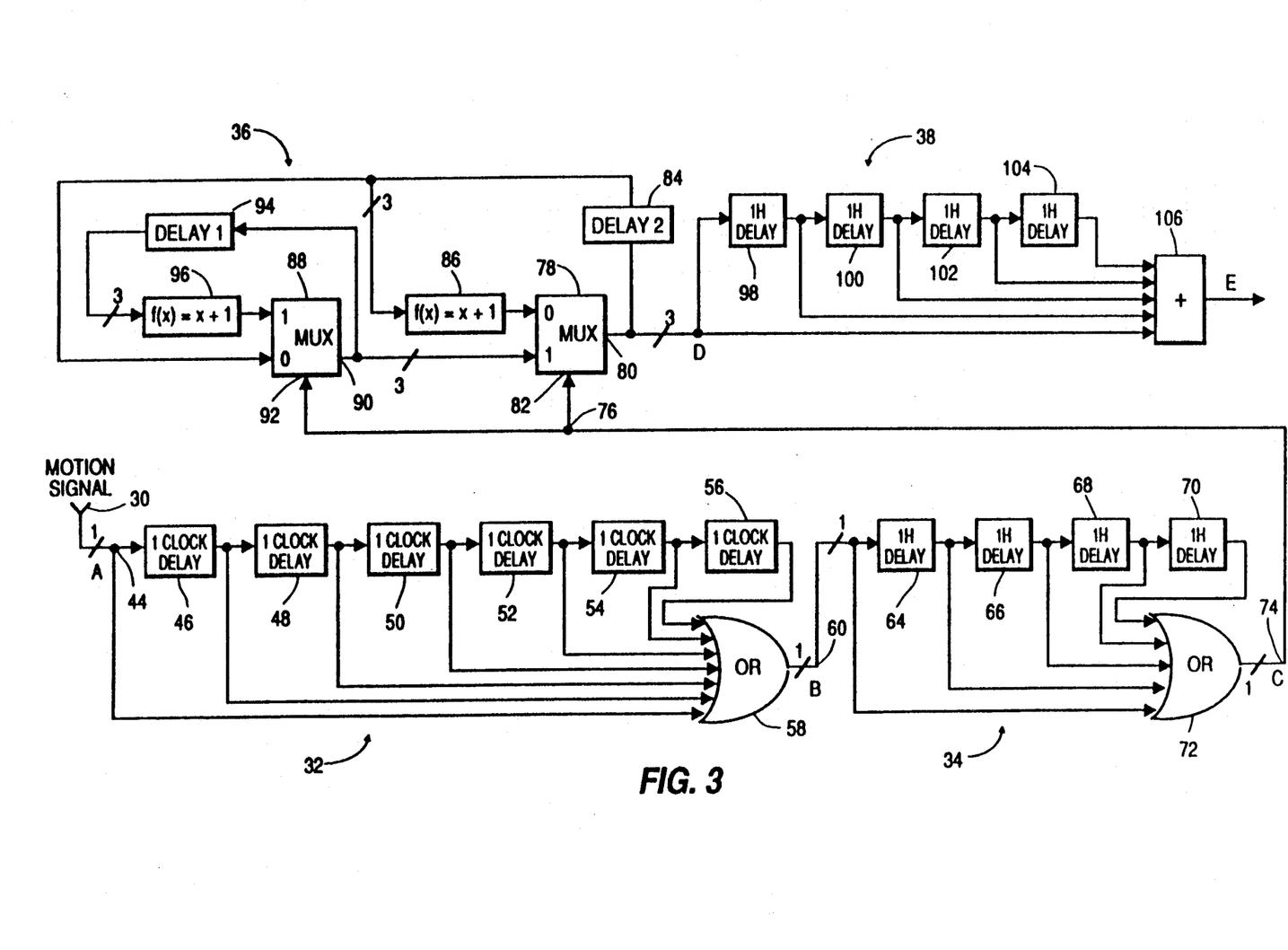
FIG. 3 illustrates the circuits of one embodiment of this invention.

Reference is now made to the circuit of FIG. 3 for a description of a detailed embodiment of the invention shown in the block diagram of FIG. 2 except for the temporal spreader 40 which is an optional feature not usually utilized. The horizontal widener 32 has an input terminal 44 to which a series of n clock delay elements are connected in series. In this example, six clock delays 46 through 56 are used. The output of an OR gate 58 is connected to an output terminal 60, and seven inputs of the OR gate 58 are respectively connected to the input terminal 44 and the ends of the clock delays 46–56 that are remote from the input terminal 44. Any control signal having an amplitude of 1 indicating the presence of a phenomenon such as motion will be repeated six times at the output terminal 60.

The vertical widener 34 of FIG. 3 is similarly constructed. There are m 1−H delays connected in series to an input terminal 62. In this example, there are four 1−H delays 64, 66, 68 and 70, so that m=4. The output of an OR gate 72 is connected to an output terminal 74 and its five inputs are respectively connected to the input terminal 62 and the ends of the 1−H delays 64–70 that are remote from the input terminal 62. Any line of control signals applied to the input terminal 62 will be repeated four times at the output terminal 74.

The horizontal widener 32 and the vertical widener 34 are shown as being connected in series, in the order named, between the input terminal 30 for the spreader system and an output terminal 76 for the widener circuits. However, as will be explained, the order of the horizontal and vertical wideners could be reversed. In either case, control signals having the logic value of 0 pass through the widener circuits 32 and 34 without any delay and the logic value of 1, indicating the presence of a phenomenon, is repeated so as to form a rectangle of logic 1's that is n+1 clock cycles wide and m+1 lines high.

The line signal spreader 36 is coupled to the output terminal 76 and functions to produce a ramp of increasing signal values along a line that increases from the value of 0 to a maximum value, such as 7, during the first n control signal periods referred to. It then holds the maximum value as long as 1's appear at the terminal 76, and when they cease, it produces a ramp of decreasing signal values along the line over a period of r clock cycles. In the usual case r=n. This is done in the same way along the line whenever the control signal assumes the logic value of 1, and along the succeeding lines so that there are m+1 identical lines.

In the circuit shown in FIG. 3 for performing the line signal spreading function just described, a MUX 78 has an output 80, an input labelled 0, an input labelled 1 and a switching control input 82 to which logical values of 0 and 1 may be applied. When a logic 0 is applied to the control input 82, the output 80 is connected to the input labelled 0, and when a logic 1 is applied to the input 82, the output 80 is connected to the input labelled 1. A one clock delay element 84 and a generator 86 that performs the function $f(x)=-1$ are connected in series between the output 80 and the input labelled 0. The generator 86 cannot go below a value of 0. Thus, when no motion is detected and a logic 0 is at the input terminal 30, logic 0's are passed through the widener circuits 32 and 34 to the terminal 76, and the output 80 of the MUX 78 will be 0. If by some chance the signal at the output 80 of the MUX 78 should be other than 0, it will be reduced to 0 in at most in clock cycles by the operation of the generator 86. As will be seen, the MUX 78 will produce the ramp of decreasing values previously referred to.

The ramp of increasing values, previously referred, to is formed by a MUX 88. It has an output 90 that is connected to the input of MUX 78 that is labelled 1, an input labelled 0, an input labelled 1 and a switching control input 92 to which logic values of 0 or 1 may be applied. As in the MUX 78, a logic 1 at the control input 92 connects the output 90 to the input labelled 1, and a logic 0 at the control 92 connects the output 90 to the input labelled 0. A one clock delay 94 and a generator 96 that performs the function $f(x)=x+1$ are connected in series between the output 86 and the input labelled 1. The generator 96 cannot produce a signal value above some selected maximum, such as 7. The input of the MUX 88 that is labelled 0 is coupled to the output 80 of the MUX 78.

The vertical signal spreader 38 that provides the signal values that can be used by the k-value generator 16 of FIG. 2 to generate the value of k and 1−k for each pixel location is comprised of means for successively making available the signal values for each position along the scan line for which a value of k is sought and the signal values of positions above them and means for combining each set of values in accordance with a predetermined function.

The means for making the signal values for corresponding pixels along the scan lines available is herein shown as being comprised of m 1−H delays. Delays 98, 100, 102 and 104 are shown so that in this particular embodiment m=4.

Whereas the signal values at the output 80 and at the ends of the four 1−H delays 98 through 104 that are remote from the output 80 could be respectively weighted before they are combined the means for combining them is an adder 106.

CIRCUIT OPERATION

The operation of the circuit FIG. 3 will now be explained by reference to FIGS. 3A through 3E that show signal values that would be present at correspondingly lettered points in FIG. 3.

Figure 3A:
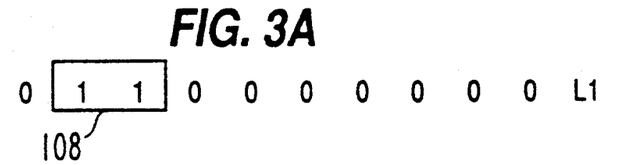
FIGS. 3A through 3E respectively represent signal values appearing at correspondingly lettered points in FIG. 3.

For the purpose of this explanation it is assumed that the control signals applied to the input terminal 30, which is point A of the control signal spreader, has only two successive values of 1 indicating the presence of a given phenomenon, such as motion, and that all the other positions on the scan line have the reference value of a logic 0. Such a situation is depicted in FIG. 3A where these original control signals of 1 that occur along a scan line L1 are enclosed in a rectangle 108. It is to be understood that line L1 would have many more signal values than those shown.

Figure 3B:
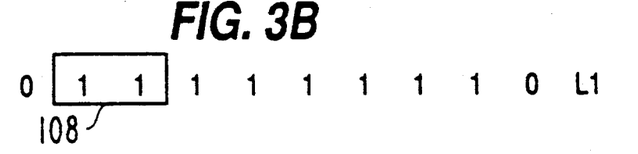

FIG. 3B illustrates the signals appearing at point B which is at the output terminal 60 of the horizontal spreader 32. This signal includes the original control signals that are within the rectangle 108 and n repetitions of the logic 1 of the second control signal value. In this example, it is assumed that n=6 so that there are eight logic 1's along the scan line L1.

The signals at point B are applied to the input terminal 62 of the vertical widener 34 which repeats the line L1 m times. In this example, m=4 so that logic 1's are produced at a point C that are included in a rectangle of signal values having a width equal to the number of contiguous control signals plus n repeated control signals and a height of m+1 lines.

Figure 3C:
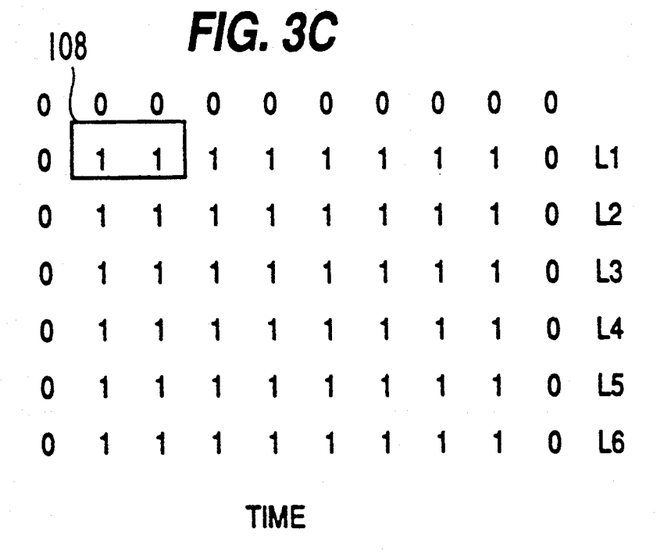

If the vertical widener 34 preceded the horizontal widener 32, its output would be as illustrated in FIG. 3B', and it is readily apparent that, after these signals are applied to the horizontal widener 32, the signals of FIG. 3C will be produced.

The line signal spreader 36 operates as follows. The control signal values for all lines including the lines L1 through L5 of FIG. 3C are successively supplied to terminal 76, which, as shown, is connected to the switching control inputs 82 and 92 of the MUXes 78 and 88. If the output 80 of the MUX 78 should not be 0, the application of a few 0's to the terminal 76 will cause the MUX 78 to count down to 0 and it will appear at the output 80. The output 90 of the MUX 88 will also be 0 because its input labelled 0 is coupled to the output 80 of the MUX 78 as long as its switching inputs 92 receives a logic 0.

As soon as the first logic 1 of the original control signal in the rectangle 108 reaches the terminal 76, the outputs 80 and 90 of the MUXes 78 and 88 are connected to their inputs labelled 1. This means that the output 80 of the MUX 78 is connected to the output 90 of the MUX 88 and that the output 90 of the MUX 88 is connected to its input labelled 1 so as to receive the incremented values provided clock by clock by the generator 96. After n clocks, in this case 6, the signal value is 7, and the generator 96 is such that its maximum output is 7. During the next two logic 1's of the line L1, the maximum value of 7 is retained. However the next control signal value is a logic 0 so that the MUXes 78 and 88 are switched. The output 80 of the MUX 78 is now connected to its input labelled 0 so that the value at its output 80 is reduced by one at each clock count. The generator 86 is such that it cannot go below 0. When another control signal, which, of course, has a value of a logic 1, is encountered, the entire process is repeated.

Figure 3D:
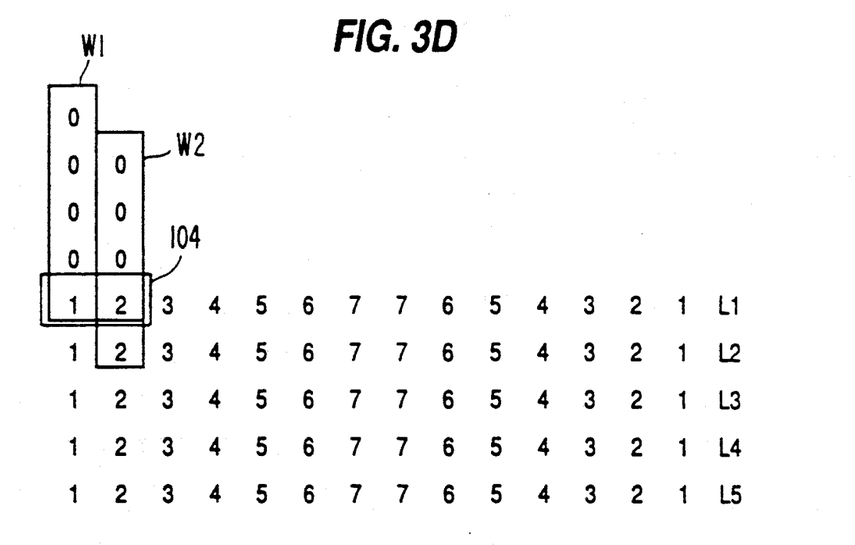

FIG. 3D illustrates the output values at the output 80 of the MUX 78 which is the point D in the circuit. Each of the lines is processed as just described so that they have identical values at corresponding positions.

It should be noted that the generators 86 and 96 could be programmed so as to generate ramps that are nonlinear rather than linear as shown, e.g., they could be programmed to have different increments or decrements for given input values.

The operation of the vertical spreader 38 will now be explained by reference to FIGS. 3D and 3E. As noted above, FIG. 3D represents successive identical lines of values that are presented at the point D which is the input of the vertical spreader. The output 80 and the 1−H delays 98-104 effectively form a vertical window such as W1 in FIG. 3D that is one clock cycle wide and m+1 lines high. After scanning across the lines, it drops by one scan line and scans across the next set of lines. In this particular embodiment, the operation of the 1−H, delays 98-104 and the adder 106 will produce a value of 1 when in the position W1, and this is the value used for the first position shown in L1. Since the top four pixels are 0's, the output of the adder 106 will be the same as that in L1 of FIG. 3D.

Figure 3E:
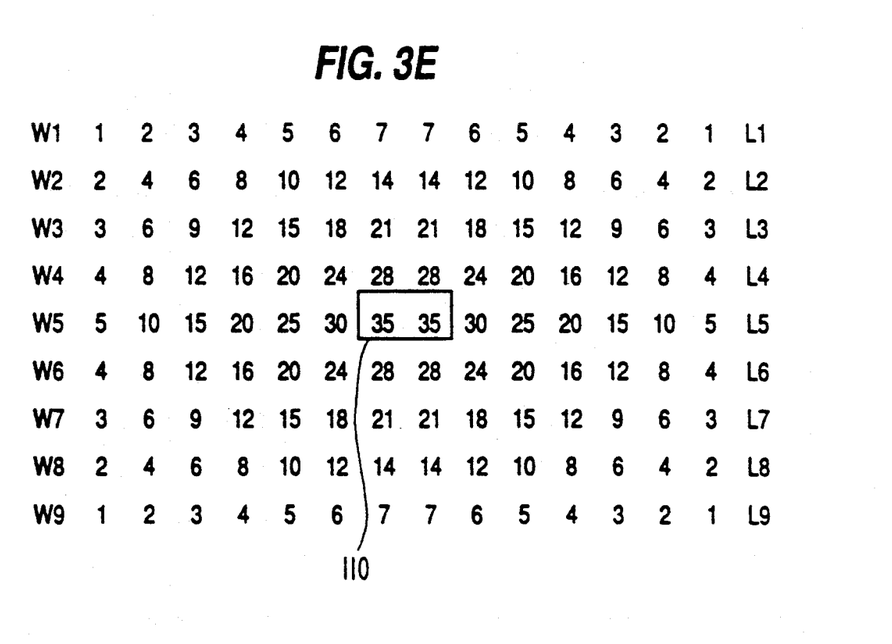

On the next scan, the window is lowered one line to a vertical position indicated by W2 and the output of the adder 106 will be as indicated in L2 of FIG. 3E. As the window makes successive scans, the resulting signal values will be as indicated in FIG. 3E. By way of illustrating, consider what the output of the adder 106 will be as the window drops vertically one line at a time, beginning at the position of the rectangle W1. The values obtained will be the values of the first column affected by the spreader of this invention. At successive vertical positions the sum of the values within the window will be incremented by 1 until a maximum of 5 is reached. At the next step, the lowest pixel in the window will be 0 so that a value of 4 will be produced.

From the values of the lines in FIG. 3D, it is apparent that the sums of the values within the window will increase as shown in FIG. 3E as the window proceeds from the left to the middle and will decrease as it proceeds farther to the right. It is also apparent that the sum of the values will increase as the window drops to the bottom line of FIG. 3D and that it will decrease as it drops below that point.

The maximum values of 35, emphasized by rectangle 110 in FIG. 3E indicate the positions of the original control signals in rectangle 108. They occur n clock counts (6 in this example) plus m lines (4 in this example) later than the original control signals. The values of 35 can be made to occur at the same time as the video by inserting the proper matching delays into the video signal path.

Figure 4A:
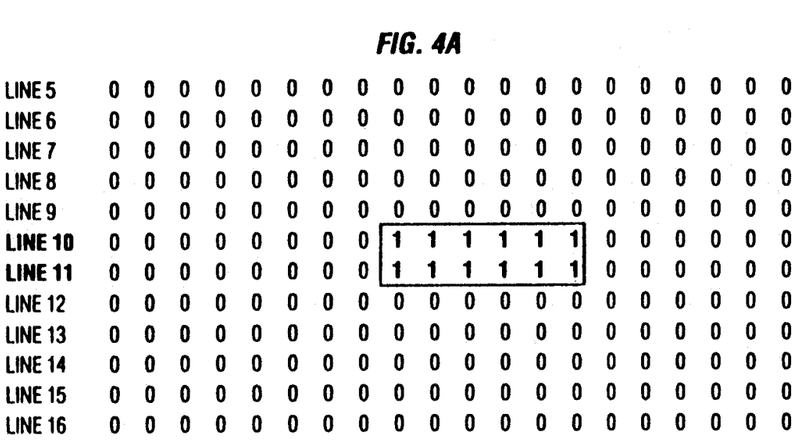
FIGS. 4A through 4E respectively represent signal values produced at like lettered points in FIG. 3 as they would be computed to derive the final control signal values as shown in FIG. 4E.
Figure 4B:
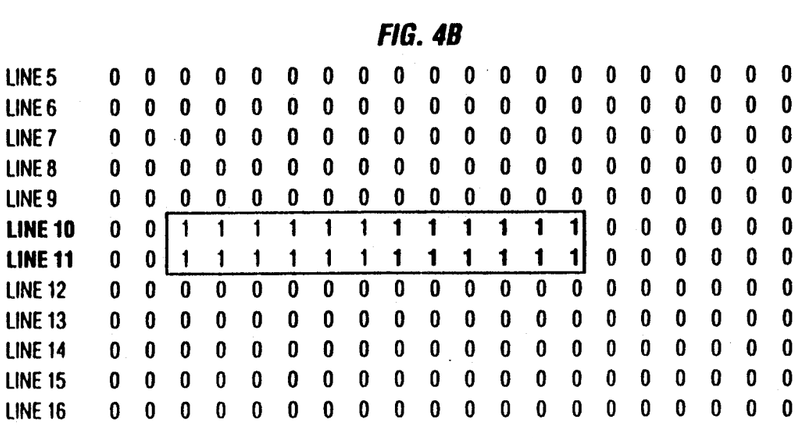
Figure 4C:
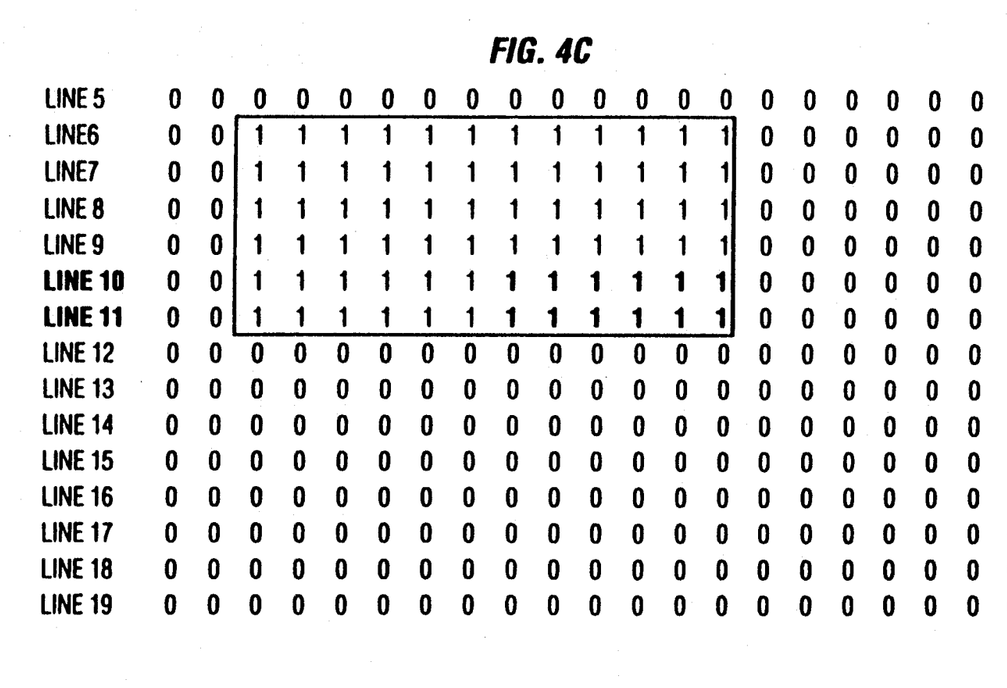
Figure 4D:
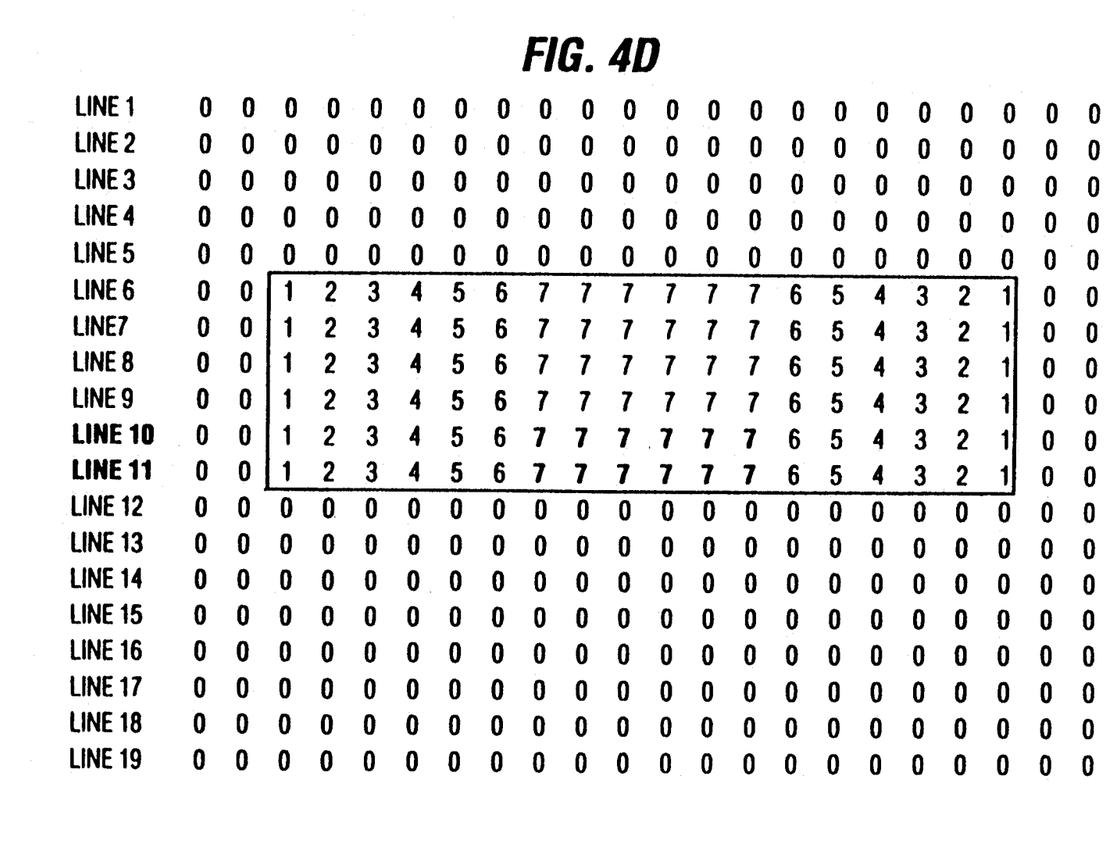
Figure 4E:
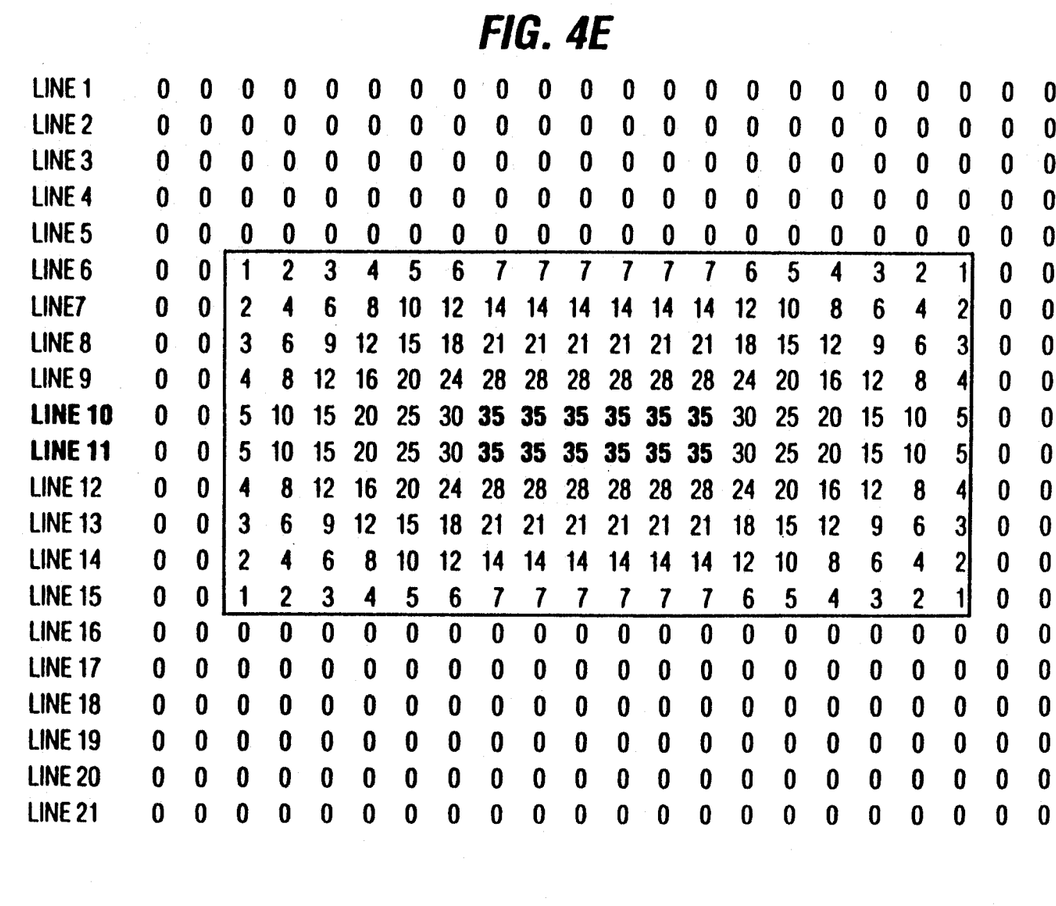

FIGS. 4A through 4E illustrate the signal values that would be produced by the control signal spreader of FIG. 3 in response to a different set of control signal pulses shown in FIG. 4A. There is this difference, however. FIGS. 3A-E show future samples as moving toward the right and downwards whereas FIGS. 4A-E show them travelling to the left and upwards. These are merely two different perspectives of the same situation.

Figure 5:
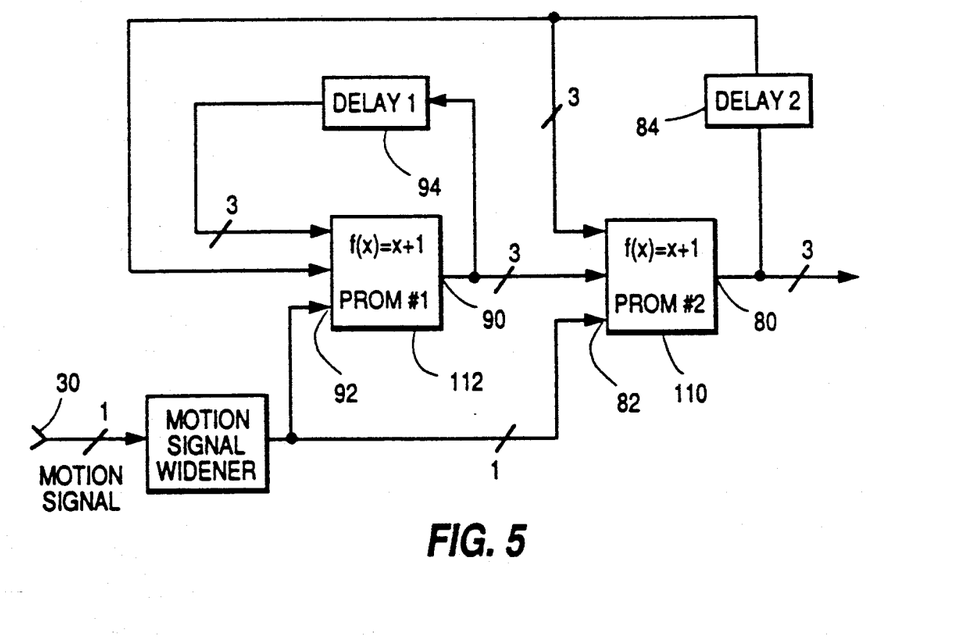
FIG. 5 illustrates a line signal spreader using PROMs rather than MUXes as in FIG. 3.
Figure 5A:
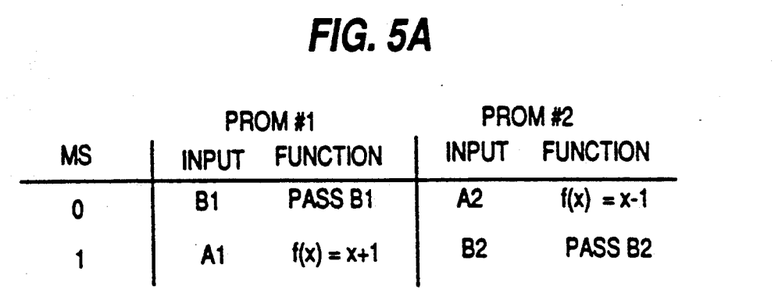
FIG. 5A is a table explaining switching functions of FIG. 5.

Reference is now made to FIG. 5 illustrating a different circuit for the line signal spreader 36. Components and points in the circuit of FIG. 5 that correspond to FIG. 3 are similarly designated. The principle difference are that a PROM 110 is programmed to perform the functions of the generator 86 and the MUX 78 and PROM 112 is programmed to perform the functions of the generator 96 and the MUX 88. The table of FIG. 5A describes the operation of the circuit of FIG. 5 in response to control signal values of 0 and 1 that appear at the terminal 76 of MUX 76 (FIG. 3). Since this circuit spreads the line signals in essentially the same way as the circuit shown in FIG. 3, no further explanation is required as will be understood by those skilled in the art.

Although several particular embodiments of the invention have been described, means other than those shown will be apparent to those skilled in the art.

What is claimed is:

1. Apparatus for spreading control signals occurring along any one of a plurality of scanned lines comprising:

an input terminal to which control signals may be applied, control signal widening means coupled to said input terminal having horizontal widening means for extending each control signal for an interval along the line in which it occurs so as to form an extended control signal and vertical widening means for repeating said line a given number of times, line signal spreading means coupled to said widening means for generating during the first portion of the extended control signal on each line a ramp of increasing values, for maintaining the maximum value of the ramp during the remainder of the extended control signal and for generating a ramp of decreasing values at the end of the extended control signal, and vertical spreading means coupled to said line signal spreading means for deriving a function of the corresponding signal values along a plurality of lines.

2. Apparatus as set forth in claim 1 wherein said control signal is a one bit signal and said control signal widening means is comprised of first and second circuits connected in series, said first circuit having an input terminal and an output terminal, n clock delay elements connected in series, an OR gate having n+1 inputs respectively connected to said input terminal and the ends of said clock delay elements remote from said input terminal and an output connected to said output terminal, said second circuit having an input terminal and an output terminal, m line delay elements connected in series, an OR gate having m+1 inputs respectively connected to the input terminal of said second circuit and the ends of said line delay elements that are remote from said other input terminal and an output connected to the output terminal of said second circuit.

3. Apparatus as set forth in claim 1 wherein said control signal is a one bit signal and said line signal spreading means is comprised of:

a first MUX having an output and first and second inputs, a one clock delay element and decrementing means coupled in series between said output of said first MUX and said first input of said first MUX said decrementing means having a lower value equal to a reference value, a second MUX having an output and first and second inputs, a one clock delay element and incrementing means connected in series between the output of said second MUX and its first input, said incrementing means having a maximum value, means for coupling the output of said first MUX with the second input of said second MUX, means connecting the output of said second MUX to the second input of said first MUX, said first MUX having means responsive to reference values for connecting its output to its first input and to a control signal for connecting its output to its second input, said second MUX being responsive to a reference value for connecting its output to its second input and to a control signal for connecting its output to its first input.

4. Apparatus as set forth in claim 1 wherein said control signal is a one bit signal and said line signal spreading means is comprised of:

a first PROM having an output and first and second inputs, a one pixel delay coupled between said output of said first PROM and said first input of said first PROM, a second PROM having an output and first and second input, a one pixel delay coupled between the output of said second PROM and its first input, means coupling the output of said first PROM to the second input of said second PROM, means connecting the output of said second PROM to the second input of said first PROM, said first PROM being programmed such that it responds to a reference value to decrement the value appearing at its first input at successive clocks until the reference value is reached and to a control signal value for connecting its second input to its output and to the output of said second PROM, and said second PROM being programmed such that it responds to a reference value for connecting its output to its second input and to a control signal value for producing at its output an increment of the value appearing at its first input at each clock count until a maximum value is reached and for holding said maximum value until a reference value occurs.

5. Apparatus for spreading a one bit control signal occurring along any one of a plurality of scan lines comprising:

a series circuit comprised of a horizontal control signal widening means and a vertical control signal widening means, said horizontal control signal widening means being comprised of an input terminal and an output terminal, a plurality of one clock delays connected in series to said input terminal, an OR gate having a plurality of inputs respectively connected to said input terminal and the ends of said delays remote from said input terminal and an output connected to said output terminal, said vertical control signal widening means being comprised of a second input terminal and a second output terminal, a plurality of one line delays connected in series to said second input terminal, an OR gate having a plurality of inputs respectively connected to said second input terminal and the ends of said one line delays remote from said second input terminal and an output connected to said second output terminal, a line signal spreading means coupled to said series circuit comprised of means for generating a ramp of increasing digital values in response to the occurrence of a one bit value, for maintaining the maximum value of said ramp while the signal from said series circuit has a one bit value and for generating a ramp of decreasing digital values when the one bit value ceases, and vertical spreading means having an input terminal coupled to said line signal spreading means, a plurality of one line delays connected in series to said last mentioned input terminal and means for deriving a signal that is a function of the signals appearing at said last mentioned input terminal and the ends of said one line delays that are remote therefrom.

6. Apparatus for spreading one bit clocked control signals occurring along scanned lines comprising:
   an input terminal to which the control signal may be applied,
   control signal widening means coupled to said input terminal for forming an extended one bit control signal by repeating each bit of said control signal for n clocks and for repeating each line m times,
   line signal spreading means coupled to said control signal widening means for generating a ramp of increasing values for n clock counts, for maintaining said maximum value during the remainder of said extended control signal and for generating a ramp of decreasing values for r clocks after the one bit control signal terminates, and
   vertical spreading means coupled to the line signal spreading means for deriving a function of signals occurring at corresponding clock counts along m+1 lines.

* * * * *

UNITED STATES PATENT AND TRADEMARK OFFICE
CERTIFICATE OF CORRECTION

PATENT NO. : 5,083,203
DATED : 21 January 1992
INVENTOR(S) : Jung-Wan Ko, et al.

It is certified that error appears in the above-identified patent and that said Letters Patent is hereby corrected as shown below:

Column 6, line 10, change "f(x)=⁻1" to --f(x)=x-1--;

Figure 3, block 86, change "f(x)=x+1" to --f(x)=x-1--;

Figure 5, block 110, change "f(x)=x+1" to --f(x)=x-1--.

Signed and Sealed this

Thirteenth Day of July, 1993

Attest:

MICHAEL K. KIRK

*Attesting Officer*  *Acting Commissioner of Patents and Trademarks*